United States Patent
Tekkam et al.

(10) Patent No.: US 12,367,212 B2
(45) Date of Patent: *Jul. 22, 2025

(54) SCHEMA VALIDATION WITH SUPPORT FOR ORDERING

(71) Applicant: SAP SE, Walldorf (DE)

(72) Inventors: Anand Tekkam, Fremont, CA (US); Pritham Rao, Sunnyvale, CA (US); Chandrakanth Bhattiprolu, Fremont, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,652

(22) Filed: Oct. 2, 2023

(65) Prior Publication Data

US 2024/0028608 A1     Jan. 25, 2024

Related U.S. Application Data

(63) Continuation of application No. 17/379,427, filed on Jul. 19, 2021, now Pat. No. 11,809,443.

(51) Int. Cl.
*G06F 16/25* (2019.01)
*G06F 16/21* (2019.01)
*G06F 16/2457* (2019.01)

(52) U.S. Cl.
CPC .......... *G06F 16/258* (2019.01); *G06F 16/211* (2019.01); *G06F 16/24573* (2019.01)

(58) Field of Classification Search
CPC ...... G06F 16/211; G06F 16/258; G06F 16/81; G06F 16/86; G06F 16/24573
See application file for complete search history.

(56) References Cited

U.S. PATENT DOCUMENTS

| | | | |
|---|---|---|---|
| 7,343,377 B1 | 3/2008 | Van Opdorp | |
| 10,884,996 B1 | 1/2021 | Suresh et al. | |
| 10,915,507 B1 | 2/2021 | Cheng et al. | |
| 11,018,959 B1 | 5/2021 | Neill | |
| 11,288,255 B2 | 3/2022 | Zenger et al. | |
| 2010/0023952 A1* | 1/2010 | Sandoval | G06Q 30/02 707/E17.127 |
| 2010/0070535 A1 | 3/2010 | Irun-Briz et al. | |
| 2014/0046934 A1 | 2/2014 | Zhou et al. | |
| 2019/0332697 A1 | 10/2019 | Williams et al. | |

(Continued)

*Primary Examiner* — Cheyne D Ly
(74) *Attorney, Agent, or Firm* — Fountainhead Law Group, PC (57) ABSTRACT

Computer-readable media, methods, and systems are disclosed for validating data associated with schemas. A user defines the object model of at least one asset and a first schema is generated in accordance with the defined object model, and a unique fingerprint is generated. Data is collected from one or more devices in accordance with the object model. The collected data is serialized, and a second schema is generated. The second schema is ordered in accordance with the first schema and a unique fingerprint is generated. The fingerprint of the first schema is compared to the fingerprint of the second schema to provide an efficient review process for determining whether the schemas are equal, and the associated data may be validated. A fingerprint cache may be updated with fingerprints associated with a plurality of schemas, as well as version history of each schema, to provide an efficient review process.

20 Claims, 5 Drawing Sheets

(56) References Cited

U.S. PATENT DOCUMENTS

2021/0096932 A1 4/2021 Sayers et al.
2022/0134222 A1 5/2022 Lebaredian et al.
2022/0335208 A1* 10/2022 Cosentino ............... H03M 7/40

* cited by examiner

SCHEMA VALIDATION WITH SUPPORT FOR ORDERING

CROSS-REFERENCE TO RELATED APPLICATIONS

The present application is a continuation of U.S. application Ser. No. 17/379,427 for "Schema Validation with Support for Ordering" filed Jul. 19, 2021, which is incorporated herein by reference.

TECHNICAL FIELD

Embodiments of the present teachings provide systems and methods of ordering and comparing message exchange schemas.

In the realm of the cloud-based computing platforms, including for example, the Internet of Things (IoT), it is essential that interoperability with third-party platforms and systems (i.e., Microsoft Azure IoT, Amazon Web Services IoT, and other third-party systems) account for valid streaming of authentic and intended data. It is essential that any streaming data digested into an internal system from a third-party system is validated for compliance with device models, schemas, or other parameters defined by the internal system. Proper schema definitions are particularly relevant when streaming data from non-trusted systems, in which sensitive data or otherwise unintended data may be inadvertently streamed to another system, such as personally identifiable information. Such inadvertent transmission of personal or sensitive information may lead to General Data Protection Regulation (GDPR) violations, among other security and legal issues. Therefore, in the streaming of data from external, third-party systems, it is critical that the streaming data complies with, and is equal to, the data that is intended to be received. Accordingly, streaming data must be validated prior to uploading, processing, or otherwise handling of the data by the internal system.

Furthermore, in addition to validating data streaming from external systems, it is likewise vital to ensure that streaming data can be processed in an efficient manner. One such method of efficiently validating steaming data is to serialize the data and attach a schema along with the data. Oftentimes, raw data, or data from IoT assets, may be serialized into a format that can be transmitted and reconstructed at another system, such as for example a schema. For example, for certain IoT systems, the number of asset models, and variations, can easily be in the range of 100's of kilobytes in size, requiring a large memory footprint. Accordingly, serializing data is an effective tool for streaming high volumes and high throughput transfer of data from one system to another.

In general, a schema defines the structure and, to some extent, the semantics of a source or target, including the data fields associated with the underlying data associated with the schema. Data can be serialized with an attached schema for streaming purposes. Once the data and schema are streamed to the internal system, a comparison of the properties of the schema can be reviewed and a determination can be made as to whether the schema from the external system is equal to the schema in the internal system. However, current serialization systems do not consider or support the use of custom properties in generating and comparing schema. Accordingly, such current systems are limiting in customizing schema. Furthermore, current systems do not consider the ordering of properties, including custom properties, while generating the schema. This can lead to the loss of information and rigidness in sequencing of properties, which can lead to different canonical forms for semantically identical messages.

Accordingly, what is needed is a system and method of comparing message schema that considers the ordering of schema properties in addition to individual definitions of the schema properties within the schema itself. Furthermore, what is also needed is a system and method of comparing message schema that is able to compare customized message schema in an efficient and accurate manner.

SUMMARY

Disclosed embodiments address such problems by providing one or more non-transitory computer-readable media storing computer-executable instructions that, when executed by a processor perform a method for validating at least one schema, the method comprising: defining, by at least one data processor derived by user input via a graphical user interface, a device model of at least one asset; generating, by at least one data processor, a first schema based at least in part on the device model of the at least one asset; updating, by at least one data processor, at least one external system with the first schema; receiving, from at least one device, data having one or more data fields related to the at least one asset; serializing, at the at least one external system, the data having one or more data fields related to the at least one asset; generating, at the at least one external system, a second schema associated with the data having one or more data fields related to the at least one asset; ordering, at the at least one external system, the second schema in accordance with the first schema; comparing the second schema to the first schema; and determining whether the second schema is equal to the first schema.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments of the present teachings are described in detail below with reference to the attached drawing figures, wherein.

The drawing figures do not limit the present teachings to the specific embodiments disclosed and described herein.

The drawings are not necessarily to scale, emphasis instead being placed upon clearly illustrating principles of the present teachings.

DETAILED DESCRIPTION

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

The subject matter of the present disclosure is described in detail below to meet statutory requirements; however, the description itself is not intended to limit the scope of the claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

Broadly, embodiments of the present technology relate to the normalization, ordering, and compressing of message schemas, providing for a method of comparing two or more schema and limiting or reducing the frequency of improper validations and/or the receiving of non-authorized or unintended data. Specifically, embodiments of the present technology are directed to defining at least one object model of at least one asset and generating a first schema in accordance with the defined object model. A unique fingerprint is generated and is associated with the first schema. Data may then be collected from one or more IoT assets or devices in accordance with the object model. The collected data from the assets or devices may then be serialized, generating a second schema. The second schema can then be ordered in accordance with the first schema and a unique fingerprint associated with the second schema is generated. The fingerprint of the first schema may then be compared to the fingerprint of the second schema to provide an efficient review process for determining whether the schemas are equal. A fingerprint cache may be updated with fingerprints associated with a plurality of schemas, as well as version history of each schema, to aid in providing an efficient review process.

Figure 1:
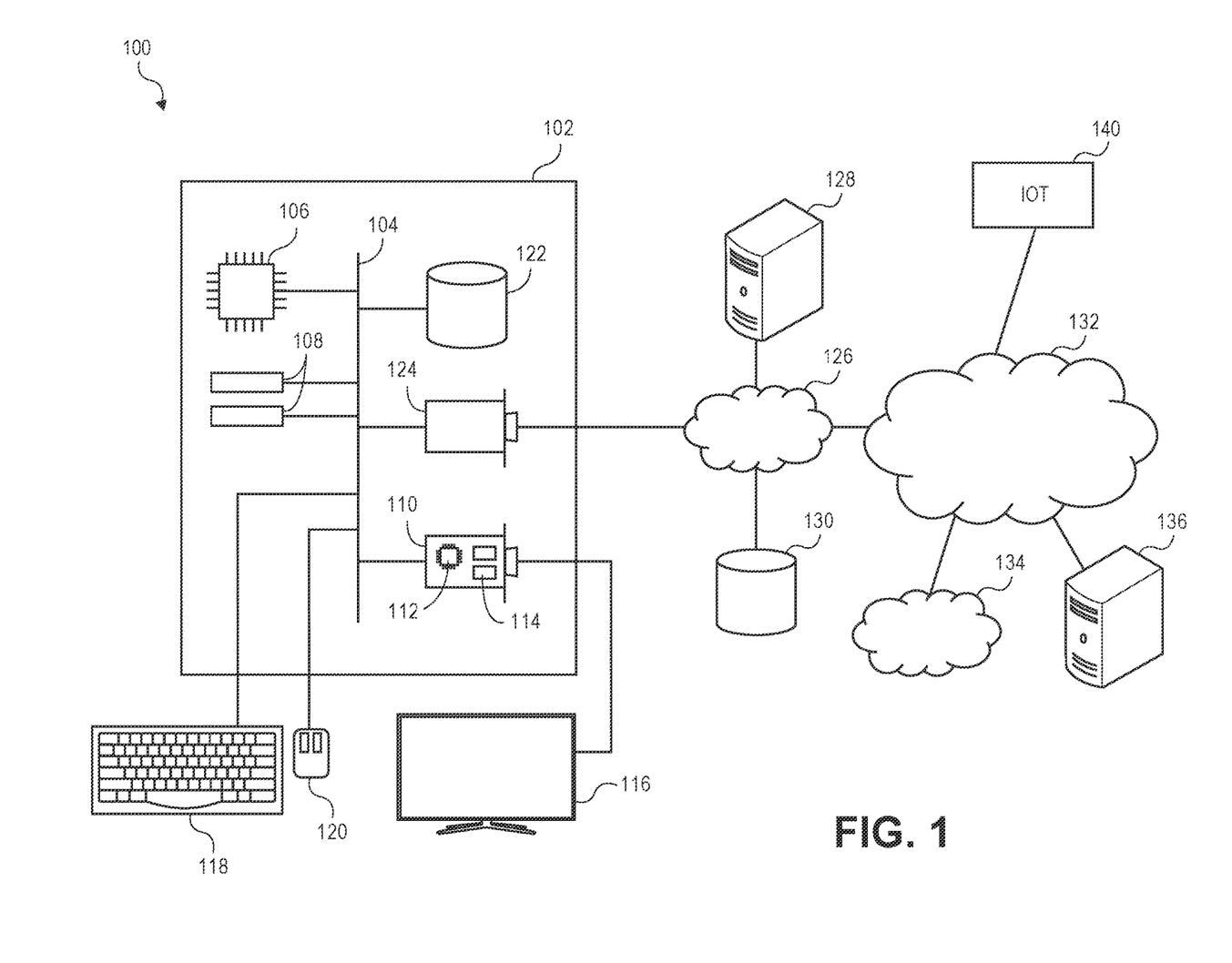
FIG. 1 depicts an exemplary hardware platform for certain embodiments.

FIG. 1 illustrates an exemplary hardware system that can form one element of certain embodiments of the technology is depicted, referred to generally by reference numeral 100. Computing device 102 can be a desktop computer, a laptop computer, a server computer, an Edge system or Embedded system, a mobile device such as a smartphone or tablet, or any other form factor of general- or special-purpose computing device. Depicted with computing device 102 are several components, for illustrative purposes. In some embodiments, certain components may be arranged differently or absent. Additional components may also be present. Included in computing device 102 is system bus 104, whereby other components of computing device 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108.

Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is computer display 116 for user interaction. In some embodiments no display is present, while in others it is integrated into computing device 102. Similarly, peripherals such as keyboard 118 and mouse 120 are connected to system bus 104. Like computer display 116, these peripherals may be integrated into computing device 102 or absent. Also connected to system bus 104 is local storage 122, which may be any form of computer-readable media and may be internally installed in computing device 102 or externally and removably attached.

Finally, network interface card (NIC) 124 is also attached to system bus 104 and allows computing device 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computing device 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In certain embodiments, computing device 102 can itself be directly connected to Internet 132. In some embodiments, the system depicted in FIG. 1 may be connected to a web-based application platform and run applications through the web-based platform or may provide the web-based platform to other computers to run applications, manage workflows, and store and manage data. Local network 126 is in turn connected to Internet 132, which connects many networks such as local network 126, remote network 134 or directly attached computers such as computer 136. In some embodiments, computing device 102 can itself be directly connected to Internet 132. Through Internet 132, computing device 102 may be communicatively coupled to other sensors, software, hardware, and other technologies for the purpose of connecting and exchanging data with the system over Internet 132, such as for example, IoT 140.

Various computer programs representative of certain embodiments comprise a plurality of code segments executable by a computing device for performing the steps of various disclosed methods. The steps of the methods may be performed in the order discussed, or they may be performed in a different order, unless otherwise expressly stated. Furthermore, some steps may be performed concurrently as opposed to sequentially. Also, some steps may be optional. The computer programs may also execute additional steps not described herein. The computer programs, systems, and methods of embodiments may be implemented in hardware, software, firmware, or combinations thereof, which broadly comprises server devices, computing devices, and a communications network.

Computer programs consistent with the present teachings may be responsive to user input. As defined herein user input may be received from a variety of computing devices including but not limited to the following: desktops, laptops, calculators, telephones, smartphones, smart watches, in-car computers, camera systems, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The monitor, server devices, and computing devices 102 may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements, the server devices may further include file stores comprising a plurality of hard disk drives, network attached storage, or a separate storage network.

The computing devices may specifically include mobile communication devices (including wireless devices), workstations, desktop computers, laptop computers, palmtop computers, tablet computers, portable digital assistants (PDA), smartphones, and the like, or combinations thereof. Various embodiments of the computing device may also include voice communication devices, such as cell phones and/or smartphones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the monitor.

The communications network may be wired or wireless and may include servers, routers, switches, wireless receivers and transmitters, and the like, as well as electrically conductive cables or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

Computer programs consistent with the present teachings may be implemented on user computing devices or, alternatively, may run on one or more server devices. In certain embodiments, exemplary computer programs may be embodied by way of a stand-alone computer program (i.e., an "app") downloaded on a user's computing device or in a web-accessible program that is accessible by the user's computing device via the communications network. As used herein, the stand-alone computer program or web-accessible program provides users with access to an electronic resource from which the users can interact with various embodiments.

Figure 2:
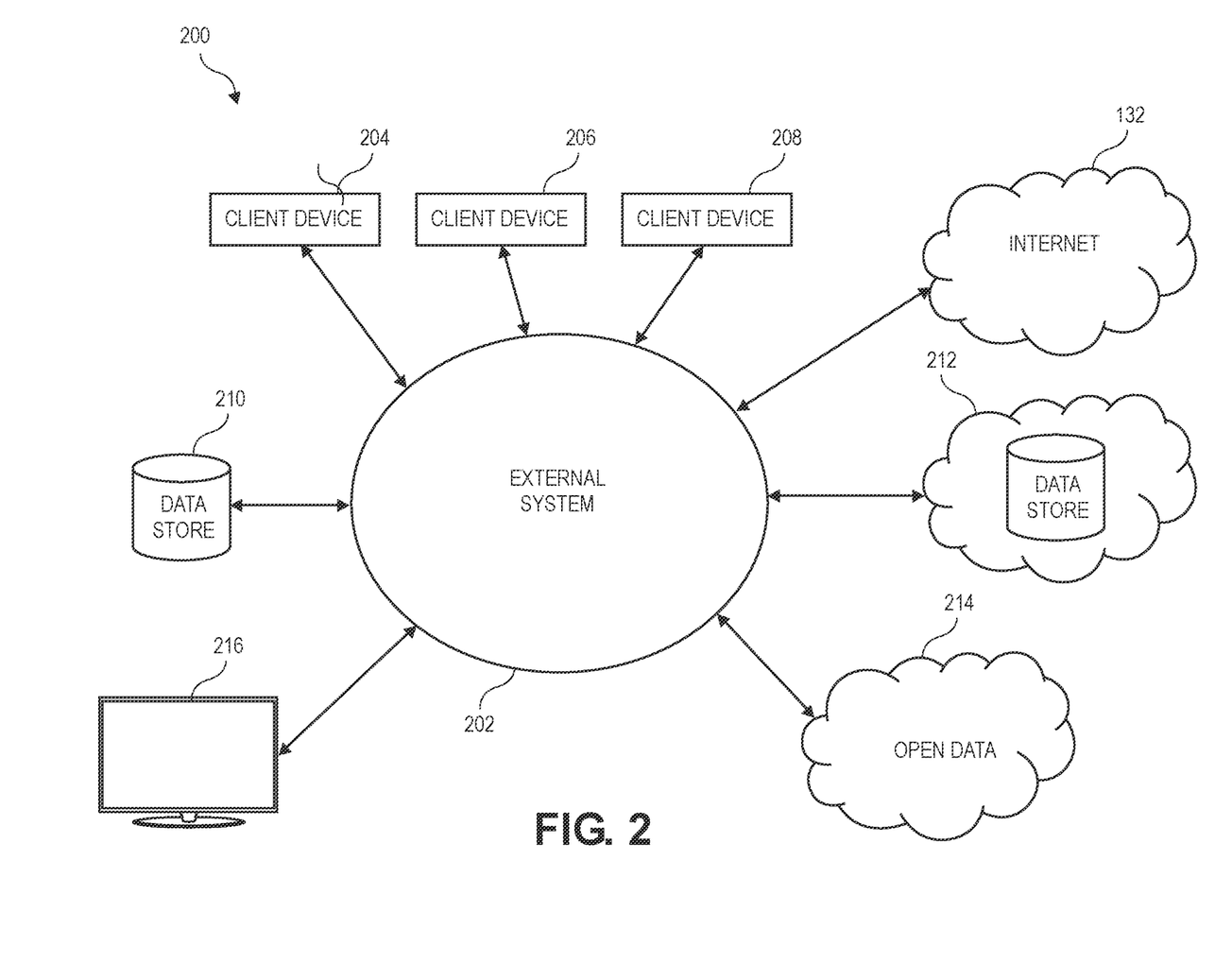
FIG. 2 depicts an exemplary IoT system for certain embodiments.

Turning now to an embodiment depicted in FIG. 2, presenting a network 200 in certain embodiments of the technology. In some embodiments, network 200 may comprise collecting system 202, which may be communicatively connected to hardware system 100 via Internet 132. In some embodiments, collecting system 202 may provide web-based workflow management and security while supporting application-to-application, business-to-business, or any other connection and communication that may be useful. Collecting system 202 may provide platform services such as integration Platform as a Service (iPaaS), Software as a Service (SaaS), Business Intelligence (BI), or any other platform services either known or yet to be implemented. For example, in some embodiments collecting system 202 may be Microsoft Azure IoT, Amazon Web Services IoT, or other third-party systems. At a high-level, collecting system 202 may be used to connect hardware system 100 to one or more IoT assets and to provide data to hardware system 100 for processing and implementation.

In some embodiments, collecting system 202 may further comprise at least one IoT asset, or other device, hardware, or technology, that can be used for collecting data and transmitting the data to at least one other system or platform. For example, collecting system 202 may connect to at least one client device, such as client devices 204, 206, and 208 in the illustrated embodiment. In some embodiments, client devices 204, 206, and 208 may be sensors used for collecting raw telemetry data. For example, in some embodiments, client device 204 may be a sensor for collecting temperature, client device 206 may be a sensor for collecting tire pressure, and client device 208 may be a sensor for collecting barometric pressure. In some embodiments, collecting system 202 may further comprise local data store 210, cloud data store 212, and open data sources 214, as additional sources of data that may be processed and transmitted to hardware system 100. In some embodiments, collecting system 202 may be accessible using any form of computing device discussed above with respect to FIG. 1, such as for example computing device 216. In some embodiments, collecting system 202 may further connect to Internet 132 for communicatively coupling collecting system 202 to other Internet capable devices and systems.

Figure 3:
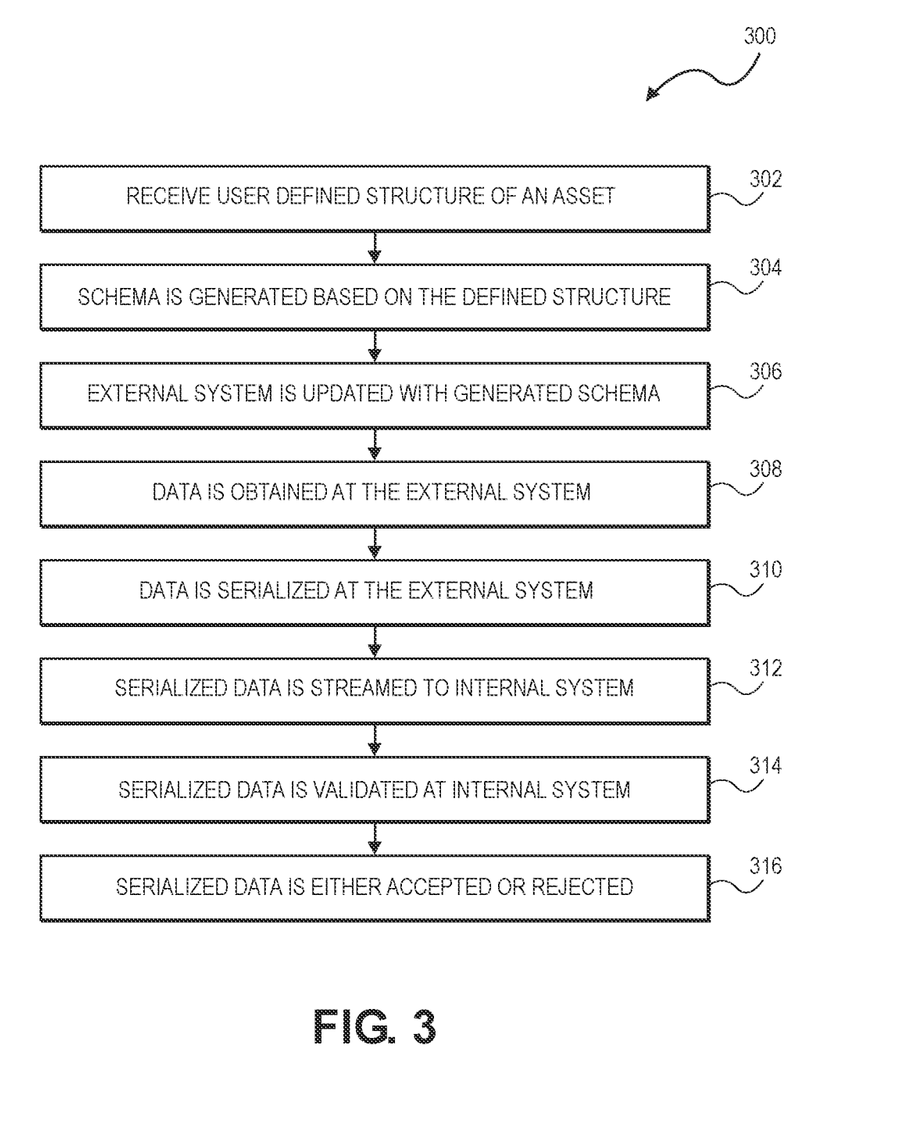
FIG. 3, depicts an exemplary flowchart illustrating a method of defining the structure of an asset, generating a schema, serializing data, and comparing the serialized data in accordance with certain embodiments.

Turning now to FIG. 3, an exemplary flowchart illustrating the operation of a method in accordance with certain embodiments is depicted and referred to generally by reference number 300. The embodiments described in connection with FIG. 3 are directed to defining the structure of an asset, generating a schema, receiving data from a collecting system, serializing the data at the collecting system, and processing the serialized data. Initially, at step 302, a user can define the structure of one or more assets. In some embodiments, a user may define the structure of the one or more assets via instructions inputted in a GUI. Alternatively, in some embodiments the structure of the one or more assets may be defined by a machine learning algorithm, or other automated methods. In some embodiments, the one or more assets may be devices, sensors, computers, mobile devices, or other hardware or technology that is capable of connecting to IoT 140 or other cloud computing systems or platforms. For example, in some embodiments the assets may be client devices 204, 206, and 208 as described above with reference to FIG. 2. In some embodiments, the defined structure of the assets may be a device model or an object model, which may further define certain data comprising at least one field. In some embodiments, a user may select any number of assets, and through the GUI, may define the device model of the one or more assets. In some embodiments, the device model may contain properties such as a name, description, asset properties, aliases, and asset hierarchy definitions, for example. By way of non-limiting example, in some embodiments a user may define a device model for collecting temperature, barometric pressure, and tire pressure of a Tesla Model S. In some embodiments, and continuing with this example, client devices 204, 206, and 208, may correspond to temperature, tire pressure, and barometric pressure sensors located on the Tesla Model S. Accordingly, client devices 204, 206, and 208 may be included in the object model of the defined assets for collecting data. In some embodiments, and as described in greater detail below, a user may modify the device model over time, and either add, remove, or modify the properties of the device model.

Next, in some embodiments, at step 304, a schema is generated based on the defined structure, or device model, of the one or more assets. In some embodiments, the schema may be generated at a processing system coupled and accessible to a user via the GUI. It will be appreciated that "processing system" as used herein is not intended to be limited to an on-site system or other limiting applications. Rather, processing system as used herein may instead refer to the system in which the structure of the one or more assets is defined, where the schema is generated, and/or the system where data from the assets is ultimately processed. In some embodiments, the processing system may be the hardware described above with respect to FIG. 1. The schema may be generated and structured using any known program or language, such as for example Extensible Markup Language (XML), JavaScript Object Notation (JSON), or other known or yet to be discovered formats. In some embodiments, the schema may define the structure of a message along with the allowed properties and different data types associated with the schema, including custom properties and/or parameters. In some embodiments, the schema may be generated and stored in a server or database coupled to the processing system and accessible to the user.

Next, in some embodiments, at step 306, a collecting system can be updated with the structure of the generated schema. By way of non-limiting example, the collecting system may be configured as network 200 described above in accordance with FIG. 2. Alternatively, in some embodiments the collecting system may be any other IoT system, BI system, or third-party cloud system or platform that may be communicatively connected to the processing system. As described in greater detail above, the collecting system may be connected or coupled with one or more devices, sensors, or other hardware comprising assets that can be used to receive raw telemetry data. In some embodiments, the one or more devices, sensors, or other assets may be associated with the defined object model from step 302.

Next, in some embodiments, at step 308, raw telemetry data, sensor data, diagnostic data, or other forms of data comprising one or more data fields may be collected or otherwise obtained from the one or more devices, sensors, or other hardware comprising the assets. In some embodiments, the one or more data fields may be related or directed to the at least one asset as described above. For example, in an exemplary embodiment, the devices, sensors, or other hardware may correspond to client devices 204, 206, and 208 as described above for collecting temperature, tire pressure, and barometric pressure of a Tesla Model S. It will be appreciated, however, that other assets, devices, sensors, hardware, assets, or other sources of data may be used for collecting or obtaining data for streaming and processing at the processing system.

Next, in some embodiments, at step 310, the collected data may be serialized for translating the data into a format that can be transmitted and stored at the processing system. In some embodiments, the collected data may be serialized at the collecting system. Alternatively, in some embodiments the collected data may be serialized at the processing system, or another external system. In some embodiments, the collected data may be serialized in accordance with, and conforming to, the structure of the schema defined by the processing system in step 304. Following serialization, a schema associated with the serialized data may be generated and coupled with the serialized data.

In some embodiments, the collected data and/or associated schema comprising the message may involve large volumes of data which may be disadvantageous for transit, and which may further require large storage space. Accordingly, in some embodiments it may be advantageous to compress that data and/or associated schema prior to transmitting to the processing system and/or prior to storing. Therefore, in some embodiments, at step 310, the serialized data and/or associated schema may optionally or additionally be normalized or otherwise compressed to remove whitespace, irrelevant data, or other fields that may be removed from the data without deviating from the structure of the schema. In some embodiments, normalizing or otherwise compressing the schema may aid in high volume and high throughput transfer of data from one system to another, reducing the volume of data transferring from one system to another.

Next, in some embodiments, at step 312, the serialized data and associated schema are streamed to the processing system. In some embodiments, the serialized data and/or associated schema may be streamed from the collecting system to the processing system as a message in bytes format. Alternatively, in some embodiments the serialized data may be streamed in a bytes format and the associated schema may be streamed in the schema's native format. The message may be streamed from the collecting system to the processing system using Internet 132, as described above with reference to FIG. 1.

Next, in some embodiments, at step 314, the serialized data and/or associated schema from the collecting system may be processed and reviewed at the processing system. In some embodiments, the review may comprise a review and comparison of the schema associated with the serialized data with the schema generated from the structure or device model as defined in the manner described above. As described in greater detail below, in some embodiments, the processing and review of the schema associated with the serialized data may optionally or additionally comprise an additional level of compression. In some embodiments, and as described in greater detail below, such compression may aid in reducing the high volume of data in transit from the collecting system to the processing system. Additionally, or optionally, such compression may further aid in increasing efficiency and reducing review time of the schema. Additionally, or optionally, and described in greater detail below, a unique identifier may be generated that corresponds with the schema associated with the serialized data.

Finally, in some embodiments, at step 316, a determination can be made as to whether the schema associated with the serialized data is a match with the schema generated from the object model. In some embodiments, and described in greater detail below, the compared schemas may only be considered a match if the schemas have identical properties.

Figure 4:
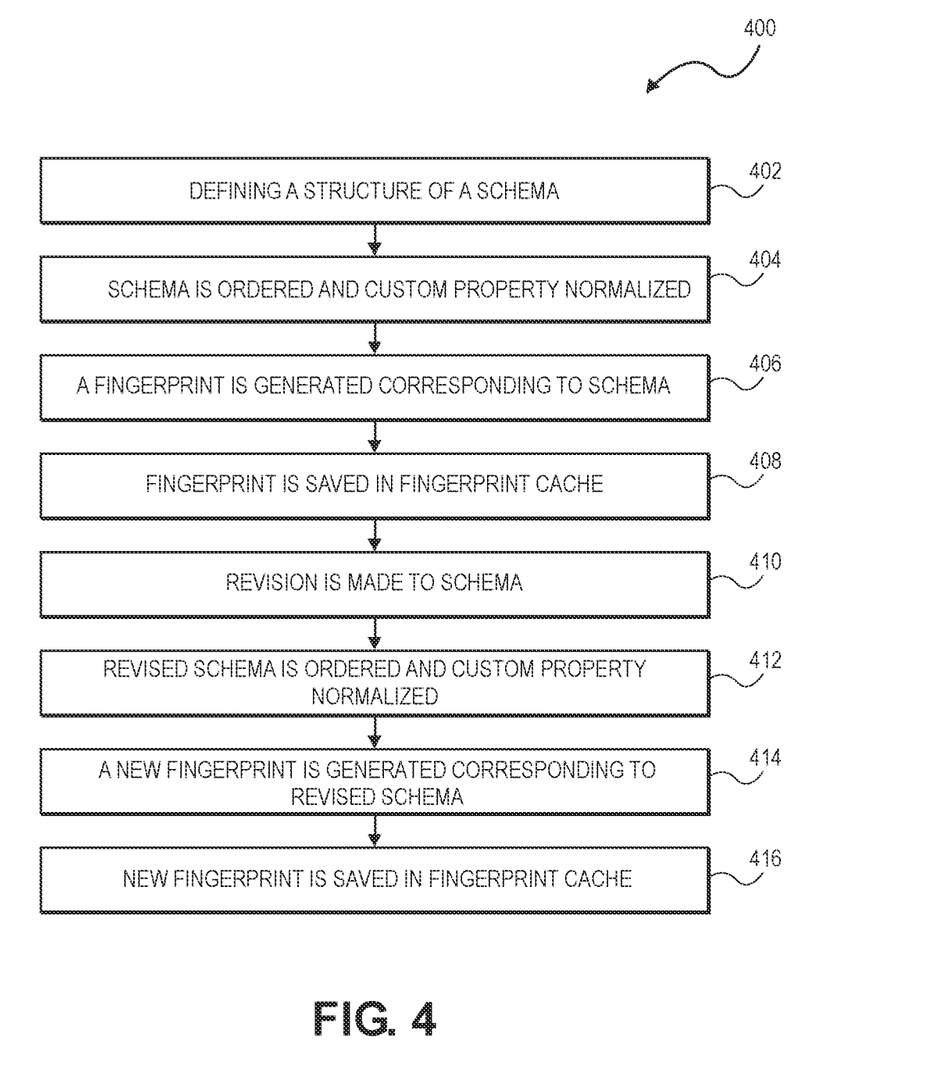
FIG. 4, depicts an exemplary flowchart illustrating a method of generating a fingerprint and updating a fingerprint cache in accordance with certain embodiments.

Turning now to FIG. 4, an exemplary flowchart illustrating the operation of a method in accordance with certain embodiments is depicted and referred to generally by reference number 400. In some embodiments, high volumes of data may be streamed from a collecting system to a processing system at thousands of bits per second or substantially higher speeds. Accordingly, efficiency of processing streaming data may be an important consideration. In some embodiments, the efficiency of processing the streaming may be data aided through compressing the schema to more compressed sizes. For example, by compressing the schema into a more compressed format, the memory footprint required to store a large number of schemas in a schema cache for validation drops significantly. Alternatively, in some embodiments the efficiency of processing streaming data may be aided through generating unique identifiers, or fingerprints, associated with a schema, and more particularly, with an ordered schema. The embodiments described in connection with FIG. 4 are directed to creating and updating fingerprints in a fingerprint cache for reviewing two or more schema for validating and determining whether the two or more schemas are equal. In some embodiments, at step 402 a structure of a schema a may be defined, either by a user, by a machine learning algorithm, or any of the other methods described above with respect to FIG. 3.

Next, in some embodiments, at step 404, the defined schema may be ordered, such that the schema is ordered in accordance with the schema associated with the user defined structure. In some embodiments, ordering of the defined schema may comprise a reordering of the properties contained within the schema in an ascending order, which may further include support for nested structures. For example, in some embodiments, the schema can be a hierarchical or nested structure, meaning, the schema can be normalized at each level and across each level within the hierarchy. In some embodiments the levels of the schema may be ordered by sorting the attributes of the schema structure alphabetically. Furthermore, in some embodiments, a tree map may be built by parsing the schema to its underlying components. For example, in some embodiments, the schema may comprise a multi-attribute schema comprising records, unions, enums, etc. In such an exemplary embodiment, text-based sorting may be implemented to ensure that a map is generated following the normalization and ordering in a uniform order. Because multi-attribute schemas are recursively parsed into its components attribute.

Next, in some embodiments, at step 406 a fingerprint or other unique identifier may be generated and based at least in part on the defined schema. For example, in some embodiments, a unique identifier, including for example a "fingerprint", may be generated that uniquely identifies a particular schema. In some embodiments, the fingerprint may be a string that uniquely identifies the schema. For example, in some embodiments, the fingerprint may be a constant 64-bit number, regardless of a size of the original schema is. However, it will be appreciated that in place of fingerprints, other unique identifiers may be utilized such as hashes. In some embodiments, the fingerprint may be implemented using a validation method such as a checksum, cyclic-redundancy-check, or a unique hash function. In some embodiments, the generated fingerprint can be unique to one specific defined schema, providing a unique identifier that is associated with only one particular schema or one particular version of a schema.

Next, in some embodiments, at step 408, the generated fingerprint associated with the defined schema may be uploaded or otherwise transmitted to a fingerprint cache. In some embodiments, the fingerprint cache may be a server or other database configured for storing data. For example, in some embodiments, the fingerprint cache may be a cloud-based server, configured for connection with Internet 132. Further, fingerprint cache may be communicatively coupled to the GUI for transmitting the generated fingerprint to the fingerprint cache. After transmitting the generated fingerprint to the fingerprint cache, the generated fingerprint may be saved in the fingerprint cache for storage and, as described in greater detail below, for comparing the generated fingerprint to other fingerprints, schemas, and/or other data.

In some embodiments, steps 402 through 408 may be repeated for any number of schemas, and theoretically, could be repeated for an unlimited number of schemas. Accordingly, the generated fingerprint for each defined schema will be a unique identifier, providing a distinct and one-of-a-kind identifier associated with each schema, wherein each fingerprint may be unique and distinct from all other generated fingerprints associated with a specific schema.

In some embodiments, a schema may evolve over time, as assets are either removed or added, or as data fields are added or removed. Accordingly, in some embodiments, at step 410 a user may make an addition, deletion, or other modification or change to an already defined schema associated with a generated fingerprint. For example, in some embodiments, a user may wish to add an additional asset, such as an additional client device, to the object model, wherein a revised schema may be generated.

Next, in some embodiments, at step 412, the revised schema may then be order and custom property normalized. For example, in some embodiments the revised schema may be order and custom property normalized in accordance with the method described above with respect to step 404. In some embodiments, and as described in greater detail below, step 412 may optionally or additionally consist of applying an alias or other identifier, allowing for a schema version history. For example, in some embodiments, the revised schema may include a schema version number, distinguishing the revised schema from the original, unmodified schema and/or form other revised schema within a same schema family.

Next, in some embodiments, at step 414, following the order and custom property normalization of the revised schema, a new fingerprint may be generated corresponding to, and associated with, the revised schema. For example, following a modification to a defined schema already associated with a generated fingerprint, the contents or properties of the revised schema will no longer be equal to the previous version of the schema. Therefore, if the revised schema were to be compared against the unmodified schema, the two schemas would no longer be equals. Accordingly, in some embodiments, a new fingerprint may be generated that corresponds to the revised schema. In some embodiments, the new fingerprint may be generated in accordance with the method described above with respect to step 406.

Finally, in some embodiments, at step 416 the newly generated fingerprint associated with the revised schema may be uploaded to the fingerprint cache. In some embodiments, the newly generated fingerprint may be uploaded to the fingerprint cache in accordance with the method described above with respect with step 408. In some embodiments, the newly generated fingerprint may be saved in the same fingerprint cache as the fingerprint associated with the unmodified schema or alternatively, may be saved in a separate fingerprint cache that is communicatively coupled to the fingerprint cache of step 408.

In some embodiments, a defined schema may be modified many times by a user. For reach revision made to the defined schema, steps 410 through 416 may be repeated following each subsequent revision or modification to the defined schema. In some embodiments, it may be advantageous for each fingerprint to comprise an optional or additional alias or secondary identifier in addition to the fingerprint itself. For example, a common alias may be applied to families or grouping of fingerprints associated with a particular schema that has undergone multiple revisions. The alias may comprise a keyword identifier, a string indicative of a specific version of a schema in a family of schemas, or other method of providing an additional information for each fingerprint.

In some embodiments, certain revisions or evolutions of a defined schema may result in incompatible evolutions, such as an addition or deletion of certain properties of the schema. In such a circumstance, such an addition or deletion of certain properties may prevent asset data from conforming to future schema structures. Accordingly, in such a scenario, otherwise valid asset data conforming to old schema structures may be rejected as invalid and prevented from being available for downstream processing. Therefore, in some embodiments if a schema becomes outdated or no longer available for use, the schema, and corresponding fingerprint, can be removed from the fingerprint cache.

Figure 5:
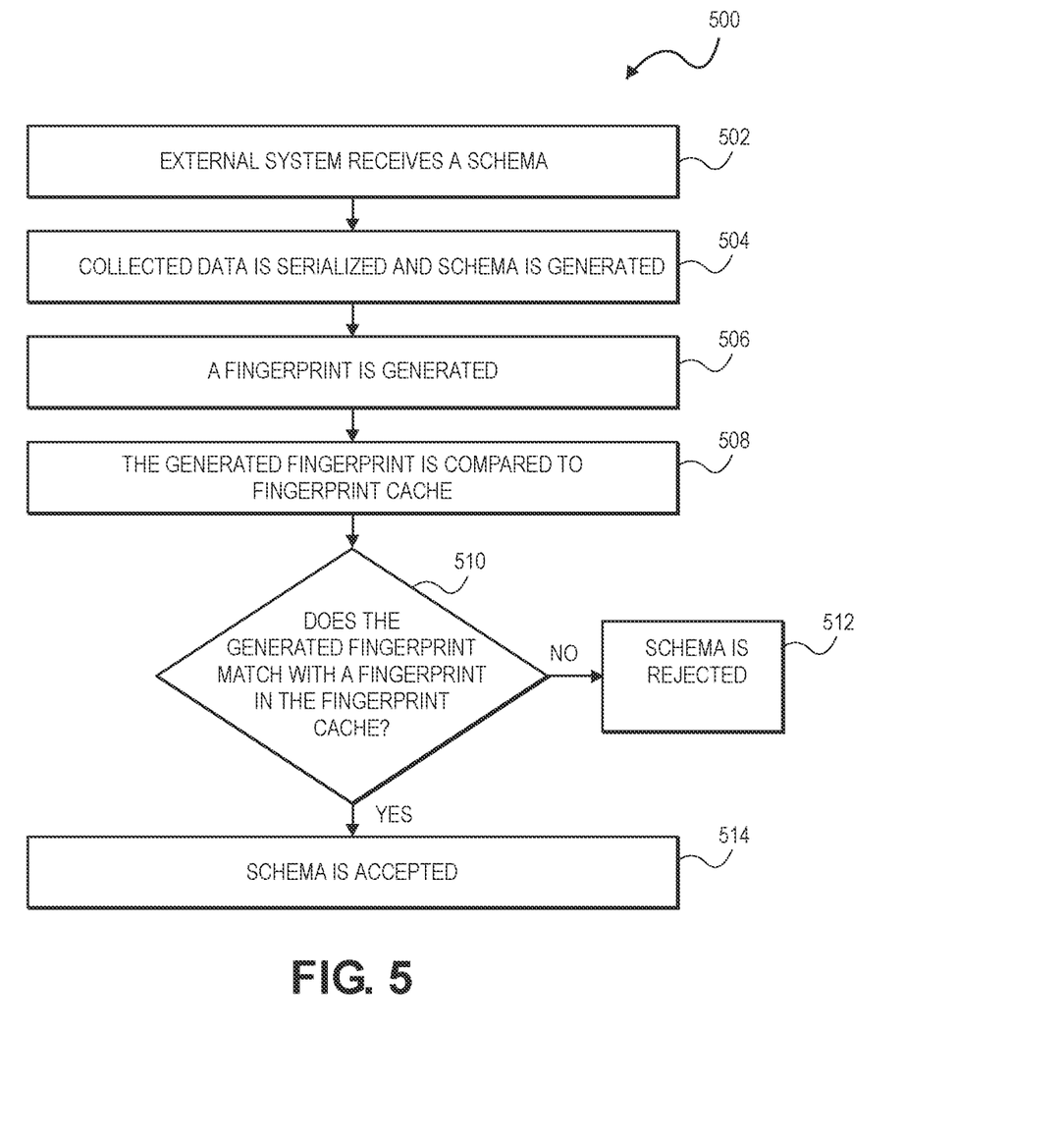
FIG. 5, depicts an exemplary flowchart illustrating a method of ordering and normalizing schema in accordance with certain embodiments.

Turning now to FIG. 5, an exemplary flowchart illustrating the operation of a method in accordance with certain embodiments is depicted and referred to generally by reference number 500. The embodiments described in connection with FIG. 5 are directed to comparing a generated schema associated with a defined object model from a processing system with a schema associated with data from one or more assets from a collecting system. First, at step 502 a collecting system receives a schema structure from a processing system. In some embodiments, the schema structure may be a schema structure generated through the processes described above with respect to FIGS. 3-4. In some embodiments, and as described in greater detail below, the schema received by the collecting system may be used for serializing and processing data collected by one or more assets associated with the collecting system. For example, in some embodiments the assets may be client devices 204, 206, and 208 described above with respect to FIG. 2.

Next, in some embodiments, at step 504, data collected or received by the one or more assets can then be serialized in accordance with the schema structure corresponding to the processing system. After serialization, a schema associated with the collected data may be generated in accordance with the schema corresponding to the processing system. In some embodiments, the schema associated with the collected data is further order and custom property normalized in accordance with the schema corresponding to the processing system. For example, in some embodiments the data serialization and generating of schema may be performed in accordance with the methods described above. In some embodiments, step 504 may occur at the collecting system prior to streaming the collected data and/or associated schema to the processing system. Alternatively, in some embodiments, step 504 may occur at the processing system after the collected data and/or associated schema are streamed from the collecting system.

Next, in some embodiments, at step 506, following the generation of a schema associated with the collected data, a fingerprint can be generated that is associated with the schema associated with the collected data. For example, in some embodiments, the fingerprint may be generated using the method described above in FIG. 4. In some embodiments, the fingerprint may be generated at the processing system after the schema is transmitted from the collecting system. Alternatively, in some embodiments the fingerprint may be generated at the collecting system and transmitted to the processing system.

Next, in some embodiments, at step 508, the generated fingerprint associated with the schema associated with the collected data may be compared to one or more previously generated fingerprints. For example, in some embodiments the schema associated with the collected data may be compared to one or more fingerprints that are saved or stored on one or more fingerprint caches associated with the processing system, such as the fingerprint cache described above in FIG. 4. In some embodiments, the comparison between the generated fingerprint of the schema associated with the collected data and the one or more fingerprints stored in the fingerprint cache may provide for a more efficient method of comparison than traditional methods of comparing the long form of two or more schemas. For example, in some embodiments, the schema associated with the collected data, the schema defined by the user at the GUI, or both, may comprise large files, including hundreds of kilobytes in size. By comparison, a compressed fingerprint may comprise a much smaller footprint, and for example may be about 64 bits in size. Such compressed files may provide for a more efficient method of comparing data items.

Next, in some embodiments, at test 510 a determination may be made on whether the generated fingerprint is a match with at least one fingerprint in the fingerprint cache. For example, in some embodiments the generated fingerprint may be selectively compared to a specific fingerprint saved in the fingerprint cache. Alternatively, in some embodiments, the generated fingerprint may be compared against a plurality of fingerprints saved in the fingerprint cache. In some embodiments, the comparison may, for example, be an equals operator on the long number resulting in an efficient comparison between the generated fingerprint and at least one fingerprint saved in the fingerprint cache. This method of comparison may particularly be advantageous in high through put scenarios, in which hundreds or thousands or kilobytes of data may be streaming every minute.

At step 512, if the determination made at test 510 determines that the generated fingerprint is not a match with any fingerprint saved in the fingerprint cache, then a determination may be made that the schema associated with the generated fingerprint is an invalid schema, and the data associated with the invalid schema is also rejected. Accordingly, in such a scenario, after the determination is made that the schema, and the associated data, are invalid, the data streaming from the collecting system can be prevented from being available for downstream processing. For example, in some embodiments a rejected schema may contain data that would create a GDPR issue and could create issues to a downstream user or service. Such schema and data containing such a GDPR issue would not match with a fingerprint saved in the fingerprint cache, and accordingly, the schema will be rejected as invalid prior to processing the data, thereby preventing the GDPR issue. In some embodiments, an optional message may be provided to a user via the GUI, alerting the user that a specific schema does not correspond to a fingerprint in the fingerprint cache.

At step 514, if the determination made at test 510 determines that the generated fingerprint is a match with a fingerprint saved in the fingerprint cache, then a determination may be made that the schema associated with the schema is a valid schema, and the data associated with the schema can be accepted. After validation, the streaming schema may be streamed and processed to the processing system for future applications and business processes.

Many different arrangements of the various components depicted, as well as components not shown, are possible without departing from the scope of the claims below. Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub combinations are of utility and may be employed without reference to other features and sub-combinations and are contemplated within the scope of the claims. Although various embodiments have been described with reference to the embodiments illustrated in the attached drawing figures, it is noted that equivalents may be employed, and substitutions made herein without departing from the scope of the recited claims.

Although the embodiments of the technology has been described with reference to the embodiments illustrated in the attached drawing figures, it is noted that equivalents may be employed and substitutions made herein without departing from the scope of the technology as recited in the claims.

The invention claimed is:

1. One or more non-transitory computer-readable media storing computer-executable instructions that, when executed by a processor, perform a method of validating at least one schema, the method comprising:
   receiving a device model of at least one asset;
   generating, by at least one data processor, a first schema based at least in part on the device model of the at least one asset;
   generating, by at least one data processor, a first unique identifier of the first schema;
   updating at least one external system with a structure of the first schema, wherein the at least one external system is configured to:
      receive, from at least one device, data having one or more data fields, wherein the one or more data fields are related to the at least one asset;
      serialize the data in accordance with the structure of the first schema;
      generate a second schema associated with the data; and
      compress the second schema to reduce a memory footprint;
   receiving, the second schema associated with the data, and the data;
   ordering the second schema in accordance with the structure of the first schema;
   reordering a plurality of properties of the second schema in an ascending order including support for nested structures;
   generating a second unique identifier of the second schema;
   comparing the second unique identifier to the first unique identifier; and
   determining whether the second schema is equal to the first schema based at least in part on the comparing of the second unique identifier and the first unique identifier.

2. The non-transitory computer readable media of claim 1, further comprising normalizing the second schema.

3. The non-transitory computer readable media of claim 2, wherein normalizing the second schema includes removing one or more of whitespace, irrelevant data, and an other field from the second schema.

4. The non-transitory computer readable media of claim 2, wherein normalizing the second schema includes removing documentation properties from the second schema.

5. The non-transitory computer readable media of claim 1, wherein reordering the plurality of properties of the second schema includes sorting the plurality of properties alphabetically.

6. The non-transitory computer readable media of claim 1, wherein reordering the plurality of properties of the second schema includes normalizing the second schema at each level and across each level of the nested structures.

7. The non-transitory computer readable media of claim 1, wherein the at least one external system is configured to:
   serialize the data in accordance with the structure of the first schema and a memory size of the at least one external system.

8. The non-transitory computer readable media of claim 1, wherein the data comprises sensor data generated by one or more sensors of the at least one device.

9. A computer-implemented method of validating at least one schema, the method comprising:
   receiving a device model of at least one asset;
   generating, by at least one data processor, a first schema based at least in part on the device model of the at least one asset;
   generating, by at least one data processor, a first unique identifier of the first schema;
   updating at least one external system with a structure of the first schema, wherein the at least one external system is configured to:
      receive, from at least one device, data having one or more data fields, wherein the one or more data fields are related to the at least one asset;
      serialize the data in accordance with the structure of the first schema;
      generate a second schema associated with the data; and
      compress the second schema to reduce a memory footprint;
   receiving, the second schema associated with the data, and the data;
   ordering the second schema in accordance with the structure of the first schema;

reordering a plurality of properties of the second schema in an ascending order including support for nested structures;
generating a second unique identifier of the second schema;
comparing the second unique identifier to the first unique identifier; and
determining whether the second schema is equal to the first schema based at least in part on the comparing of the second unique identifier and the first unique identifier.

10. The method of claim 9, further comprising normalizing the second schema.

11. The method of claim 10, wherein normalizing the second schema includes removing one or more of whitespace, irrelevant data, and an other field from the second schema.

12. The method of claim 10, wherein normalizing the second schema includes removing documentation properties from the second schema.

13. The method of claim 9, wherein reordering the plurality of properties of the second schema includes sorting the plurality of properties alphabetically.

14. The method of claim 9, wherein reordering the plurality of properties of the second schema includes normalizing the second schema at each level and across each level of the nested structures.

15. The method of claim 9, further comprising:
processing the data received from the at least one device in accordance with the second schema having been validated; and
controlling an operation of the at least one device in accordance with the data having been processed.

16. A system comprising at least one data processor and at least one non-transitory media storing computer executable instructions that when executed by the at least one data processor cause the system to carry out actions for validating at least one schema, the actions comprising:
receiving a device model of at least one asset;
generating, by at least one data processor, a first schema based at least in part on the device model of the at least one asset;
generating, by at least one data processor, a first unique identifier of the first schema;
updating at least one external system with a structure of the first schema, wherein the at least one external system is configured to:
receive, from at least one device, data having one or more data fields, wherein the one or more data fields are related to the at least one asset;
serialize the data in accordance with the structure of the first schema;
generate a second schema associated with the data; and
compress the second schema to reduce a memory footprint;
receiving, the second schema associated with the data, and the data;
ordering the second schema in accordance with the structure of the first schema;
reordering a plurality of properties of the second schema in an ascending order including support for nested structures;
generating a second unique identifier of the second schema;
comparing the second unique identifier to the first unique identifier; and
determining whether the second schema is equal to the first schema based at least in part on the comparing of the second unique identifier and the first unique identifier.

17. The system of claim 16, further comprising normalizing the second schema.

18. The system of claim 17, wherein normalizing the second schema includes removing one or more of whitespace, irrelevant data, and an other field from the second schema.

19. The system of claim 17, wherein normalizing the second schema includes removing documentation properties from the second schema.

20. The system of claim 16, further comprising:
processing the data received from the at least one device in accordance with the second schema having been validated; and
controlling an operation of the at least one device in accordance with the data having been processed.

* * * * *